United States Patent [19]

Payton, Jr.

[11] 4,424,865
[45] Jan. 10, 1984

[54] THERMALLY ENERGIZED PACKER CUP

[75] Inventor: Donald G. Payton, Jr., Jackson, Miss.

[73] Assignee: Sperry Corporation, New York, N.Y.

[21] Appl. No.: 299,767

[22] Filed: Sep. 8, 1981

[51] Int. Cl.³ .............................................. E21B 33/12
[52] U.S. Cl. .................................... 166/302; 166/202;
166/179; 277/26; 148/402
[58] Field of Search ........................ 166/202, 179, 302;
277/26; 29/446, 447; 175/17; 285/381; 148/402

[56] References Cited

U.S. PATENT DOCUMENTS 2,305,282  12/1942  Taylor et al. ........................ 166/202
2,723,721  11/1955  Corsette ........................ 166/202 X
3,053,321  9/1962  Ortloff ............................ 166/202 X
3,285,470  11/1966  Frei et al. ......................... 29/447 X
4,281,841  8/1981  Kim et al. ....................... 285/381 X Primary Examiner—Ernest R. Purser
Assistant Examiner—Michael Starinsky
Attorney, Agent, or Firm—Howard P. Terry

[57] ABSTRACT

In a geothermal production well, oil well or gas well, a thermally energized packer cup having a tapered elastomer body and a reinforcing element fabricated from a shape memory alloy seals the well casing when the packer cup is heated to the transformation temperature of the shape memory alloy.

7 Claims, 1 Drawing Figure

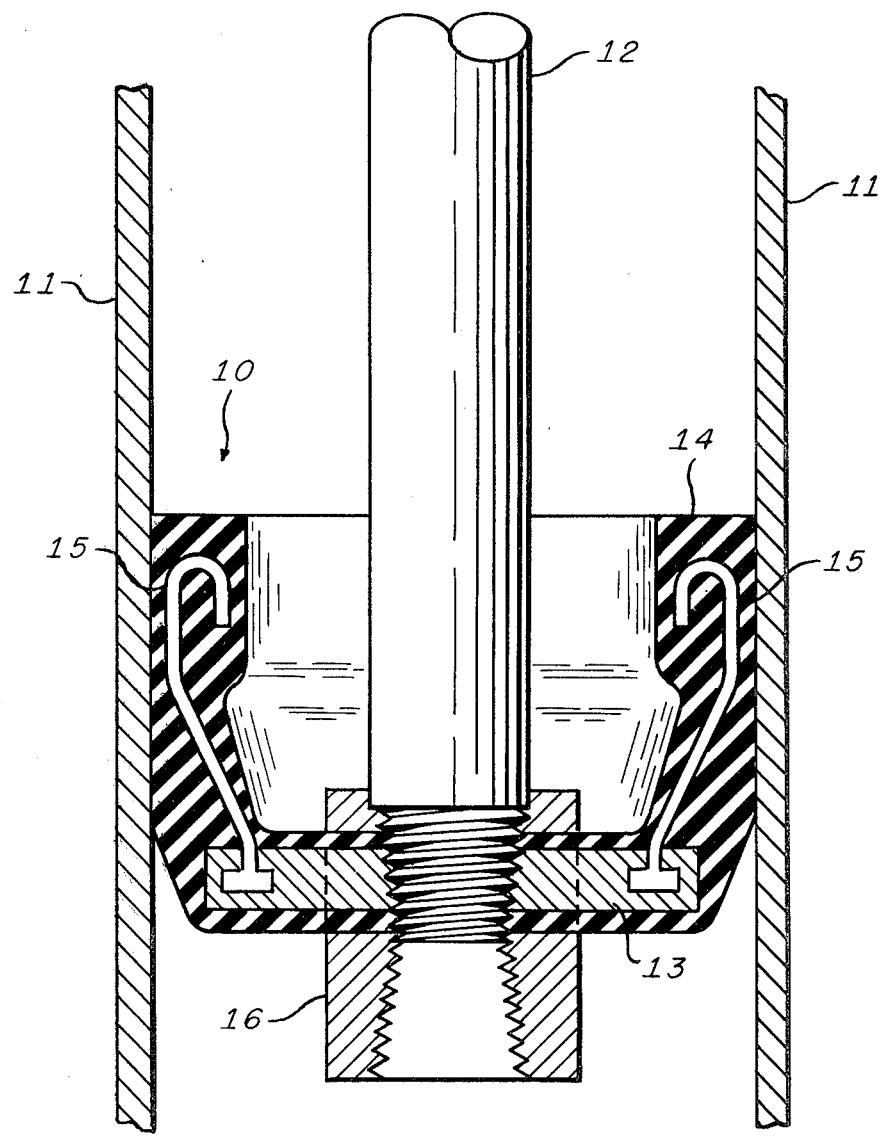

4,424,865

THERMALLY ENERGIZED PACKER CUP

BACKGROUND OF THE INVENTION

1. Field of the Invention

The present invention relates to packer cups and more specifically to a thermally energized packer cup particularly suitable for sealing a pipe in a geothermal production well, an oil well, or a gas well.

2. Description of the Prior Art

Integral packer cups are commercially available devices used in oil, gas, and geothermal production wells to seal high and low pressure zones within the confines of the well. These cups are typically fabricated from elastomeric materials with metal reinforcing materials embedded in the elastomer. The cup is mounted on a mandrel or pipe prior to installation in the well. To effect a downwell seal, these cups are slightly oversized compared to the inner diameter of the well casing so as to bear against the casing wall. The seal is further enhanced by the resultant force due to the differential pressure across the seal. The integral packer cup as it is presently designed and fabricated has two major shortcomings. First, a portion of the elastomer material is necessarily removed during installation due to "rubbing" against the rough wall of the well casing thereby reducing or eliminating the interference fit between the cup and casing. This puts a higher dependency for effecting the seal on the resultant force due to the differential pressure. Also, the "rubbing" may expose the metal reinforcement embedded in the elastomer to corrosive fluids which may be present in the fluid to be sealed, resulting in premature seal failure. Secondly, the magnitude of the sealing force developed due to the interference is difficult to predict and control. Accordingly, there is a need for a packer cup which overcomes the shortcomings of the prior art.

SUMMARY OF THE INVENTION

The apparatus of the present invention includes a packer cup having a tapered elastomer body and a reinforcing element which is fabricated into an original shape from a "shape memory alloy" such as nickel-titanium, gold-cadmium, or indium-thallium. The packer cup is forced to assume a restrained shape and is inserted into a well casing using a mandrel or other device. When heat is applied to the packer cup, the reinforcing element returns to its original shape, thereby causing the packer cup to seal the well casing.

BRIEF DESCRIPTION OF THE DRAWINGS

The sole FIGURE illustrates in a cross sectional side view a well casing and a thermally energized packer cup.

DESCRIPTION OF THE PREFERRED EMBODIMENT

Referring now to FIG. 1, a cross sectional side view illustrates the apparatus of the present invention. A thermally energized packer cup 10 is fastened to a pipe or mandrel 12 by a threaded locking collar 16 and is disposed within a conduit or well casing 11 of the type commonly used in geothermal production wells, oil wells, or gas wells. The packer cup 10 preferably includes a metal base plate 13, a tapered elastomer body 14 and a plurality of fingers or reinforcement elements 15 fabricated from a "shape memory alloy".

The term "shape memory alloy" refers to a series of engineering alloys which possess a unique mechanical shape memory. Alloys which exhibit this characteristic include 55 Nitinol (nickel-titanium), gold-cadmium, and indium-thallium. Descriptions of these alloys may be found in references such as Jackson, C. M. et al., "55-Nitinol-The Alloy with a Memory: Its Physical Metallurgy, Properties, and Applications", NASA-SP 5110, 1972; or U.S. Pat. No. 3,403,238, "Conversion of Heat Energy to Mechanical Energy", by Buehler et al, and issued Sept. 24, 1968.

The "memory" characteristic is induced in these alloys by the following process. First, the material is obtained in a basic shape such as a wire, rod, sheet, tube, extrusion, or casting. The material is then cold worked into the shape which it will be required to "remember". Next, the cold worked shape is clamped in a fixture that constrains it in its memory configuration. The part, restrained from moving by the fixture, is given a heat treatment to impart the memory and is then cooled. After the part has cooled below the transformation temperature its memory capability can be checked. This is accomplished by first cold working the part into an intermediate configuration. Then exposure of the part to a temperature source above its transformation temperature will cause it to return, i.e., remember, to the original pre-cold worked configuration. The magnitude of the transformation temperature, i.e., the temperature above which the material must be heated to restore it to its memory shape, can be anywhere from $-238°$ C. to $+166°$ C. depending on the chemical composition of the alloy.

The fingers or reinforcement elements 15 would therefore, be fabricated according to the above described process and joined with the metal base plate 13 and the tapered elastomer body 14 to form the packer cup 10. The packer cup 10 has an original circular shape whose outer diameter is approximately 0.02" larger then the inner diameter of the well casing 11. Prior to installing the cup 10 in the well casing 11 the packer cup 10 including the reinforcement elements 15 would be strained to an intermediate shape which would prevent contact with the well casing 11 during installation. Once the packer cup 10 has been positioned at the desired downwell location within the well casing 11, the thermal energy of the well fluid will cause the "shape memory alloy" of the reinforcement elements 15 to return to their original coldworked, i.e. prestrained, configuration thus sealing the well bore.

Preferably, the thermal energy of the well fluid is of a temperature which causes the "shape memory alloy" to function in the desired manner. The apparatus of the present invention, however, is adaptable for use in wells having a well fluid temperature that is either too "cold" or too "hot" relative to the transformation temperature of the "shape memory alloy". The thermally energizing packer cup 10 can be used in "cold" production wells, i.e. those wells where the production fluid is below the transformation temperature of the particular "shape memory alloy." In these instances, a hot auxiliary fluid or catalyst would be employed to energize the seal. The packer cup 10 can also be used in "hot" wells such as a geothermal production well where the well can be "killed", i.e., cooled, by circulating a dense, cold kill fluid in the well bore prior to installation. Once the thermally energizing packer cup 10 is positioned in the desired downwell location, natural convection of heat from the hot well fluid will in time heat up the kill fluid and energize the packer cup thereby effecting the well bore seal.

It can be appreciated that the apparatus of the present invention includes several advantageous features. First, straining the cup 10 into an intermediate shape before installation would eliminate the removal of elastomer 14 from the cup by "rubbing" against the rough walls of the well casing 11, thereby improving the life expectancy of the cup. Secondly, the mechanical force which results as the "shape memory alloy" returns to its original prestrained configuration, further enhances the well bore seal. Thirdly, the forces exerted by the shape memory parts can be readily predicted quantitatively. This would allow for better control of the sealing forces which could further improve the cup life.

While the invention has been described in its preferred embodiments, it is to be understood that the words that have been used are words of description rather than of limitation and that changes within the purview of the appended claims may be made without departing from the true scope and spirit of the invention in its broader aspects.

I claim:

1. A thermally energized packer cup comprising:
   reinforcing means which is fabricated from a shape memory alloy that is cold worked into an original shape, constrained, heated to a transformation temperature, and cooled; and
   a tapered elastomer body which is coupled to said reinforcing means,
   said reinforcing means so constructed and arranged that said elastomer irreversibly is urged to expand when said means is thermally energized.

2. A method for sealing a conduit with a packer cup having a tapered elastomer body and reinforcing means having an original shape fabricated from a shape memory alloy, comprising:
   restraining said packer cup and said reinforcing means into a restrained shape having an outer diameter less than the inner diameter of said conduit;
   inserting said restrained packer cup into said conduit; and;
   applying heat to said packer cup in order to heat said reinforcing means to a transformation temperature, whereby said reinforcing means returns to its original shape and said elastomer body irreversibly expands and seals said conduit.

3. A packer cup according to claim 1 wherein said memory alloy is selected from the group consisting of nickel-titanium, gold-cadmium, and indium-thallium.

4. A packer cup according to claim 3 wherein said reinforcing means includes a metal base plate and a plurality of reinforcing elements fabricated from said memory alloy.

5. A thermally energized packer cup comprising:
   a tapered elastomer body,
   a rigid base plate laterally extended within said body,
   a plurality of restrained reinforcing wires fabricated from a alloy, said wires each having a lower end joined circumferentially to said base plate and a body extending substantially linearly from and orthogonal to said base plate and embedded in said elastomer body,
   whereby said elastomer body is irreversibly urged to expand by said reinforcing wires when thermally energized.

6. A packer cup according to claim 5 wherein sid memory alloy is selected from the group consisting of nickel titanium, gold-cadmium, and indium-thallium.

7. The method for sealing a packer cup as defined in claim 2, wherein said memory alloy is selected from the group consisting of nickel-titanium, gold-cadmium, and indium-thallium.

* * * * *